Jan. 3, 1933.          C. G. STRANDLUND          1,892,753
                            PLOW
                      Filed July 26, 1929
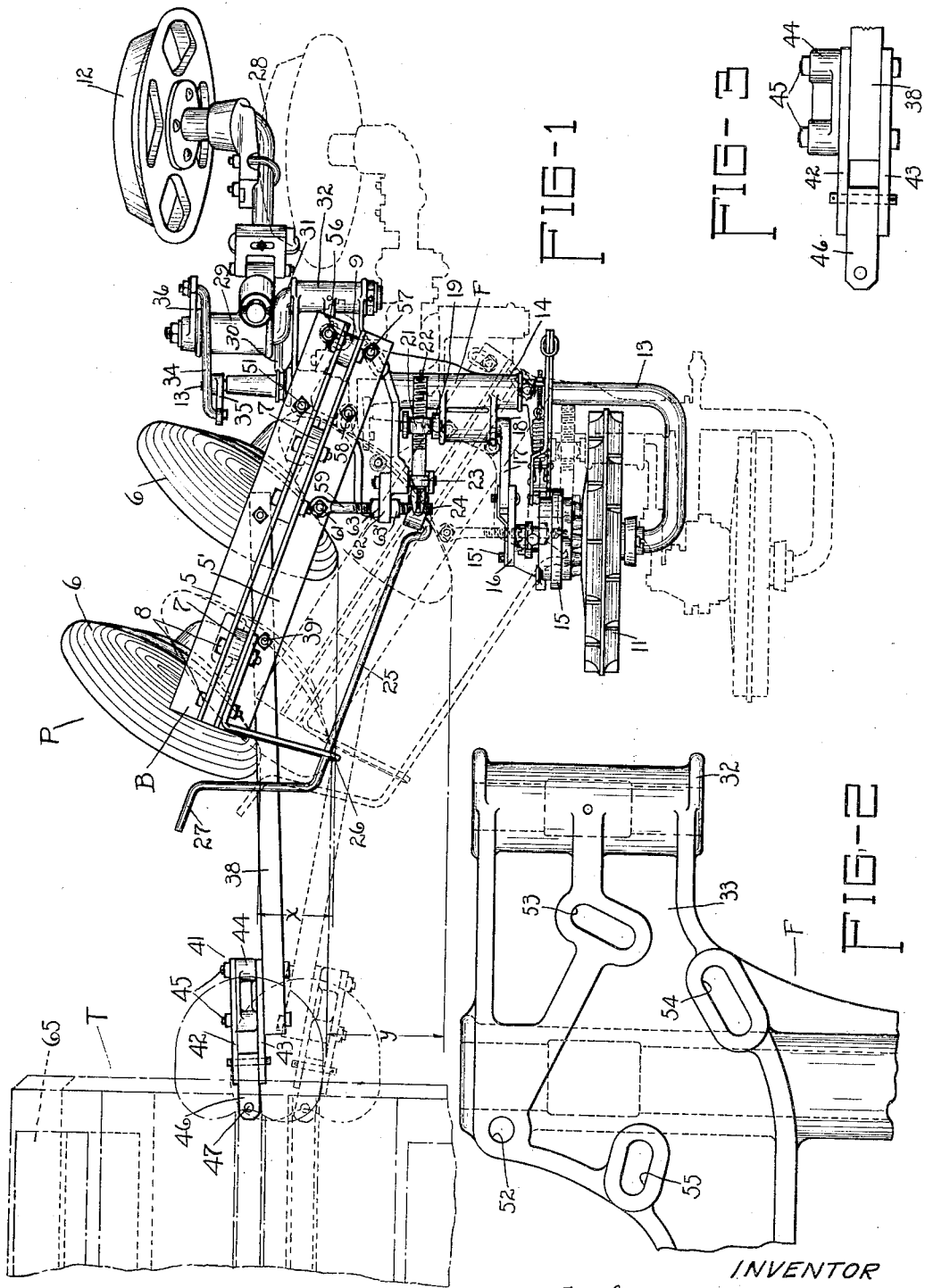
WITNESS
Walter Ackerman
INVENTOR
Carl G. Strandlund
BY
Brown, Jackson, Boettcher & Dienner
ATTORNEYS Patented Jan. 3, 1933

1,892,753

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

PLOW

Application filed July 26, 1929. Serial No. 381,103.

The present invention relates to plows and has as its principal object to provide an improved adjustable plow structure designed to permit changing the width of the furrow or furrows cut by the plow elements, such having particular application to disk plows.

Various conditions and factors may make it desirable to adjust the width of the furrow. For example, if the soil is soft it may be expedient to cut a relatively wide furrow for plowing as much ground as possible in each run of the plow, whereas, if the ground is hard, it may be necessary to reduce the width of the furrow to a narrow cut. The depth of the furrow desired and the available power of the tractor or other source of draft energy may also make it desirable to adjust the width of the furrow. By my present construction I have provided a plow structure wherein the widths of the furrows cut by the discs can be readily adjusted to any degree within relatively wide limits by a simple and easy adjusting operation.

Another feature of the invention resides in an improved adjustable draft connection cooperating with the adjustment for changing the width of the furrow cut so that the proper line of draft will be maintained in the different adjustments of the implement.

Referring to the accompanying drawing illustrating a preferred embodiment of the invention:—

Fig. 1 is a plan view of the plow connected to a tractor, showing in full lines one adjustment for a narrow furrow cut and a corresponding adjustment of the draft hitch, and showing in dotted lines another adjustment for a wide furrow cut and another adjustment of the draft hitch;

Fig. 2 is a fragmentary plan view of a portion of the wheel supported frame structure showing the manner in which adjustment and clamping is effected between such frame structure and the beam structure; and Fig. 3 is a fragmentary detail view showing another adjustment of the draft connection.

The plow is indicated in its entirety at P and the rear portion of a tractor is indicated at T. The plow comprises a beam structure B of any desired construction, but preferably built of two heavy angle bars 5, 5' with their vertical flanges disposed back to back. Two plow disks 6 are shown as being supported by this beam structure, but obviously any number of disks may be carried thereby. Each disk is mounted on a supporting shank or standard 7 which has its upper end extending between the vertical flanges of the bars 5, 5' where it is secured by bolts 8.

A suitable spacing sleeve 9 may be bolted between the rear ends of the bars 5, 5'. This beam structure is mounted on a wheel supported frame structure indicated in its entirety at F, the adjustment of the width of furrow cut being effected by adjusting the horizontal angle between these two structures, as will be presently described. The wheel supported frame structure F may likewise be of any desired construction supported on any desired arrangement of wheels, the preferred form shown being supported on a land wheel 11 and having operative connection with a rear furrow wheel 12. The land wheel 11 is journaled on the inwardly turned spindle end of a crank axle 13 which has its upper transverse portion journaled in a long bearing sleeve 14 formed as a part of the frame structure F. In the power lift type of plow shown, a power lift clutch 15 is mounted on the spindle end of the crank axle to be driven by the land wheel 11, this clutch upon being engaged, transmitting half-revolution throws to a crank pin 15' connected through a link 16 with an adjustable arm 17 mounted on the frame structure. The manner in which this clutch is engaged and automatically released, and the manner in which the throw of the crank pin swings the land wheel backwardly or forwardly for raising or lowering the plow is well understood in the art. For adjusting the vertical angle of the arm 17, and thereby adjusting the plowing depth of the implement, I have shown this arm as being extended from a cross shaft 18 which has bearing support on the frame structure and has an arm 19 extending approximately vertically from its other end. A threaded nut 21 is swiveled on a horizontal pivot pin mounting carried by the swinging end of the arm 19, and screwing through this nut is a threaded shaft 22.

Said shaft is axially rotatable in a bearing sleeve 23 suitably pivoted to the frame, such sleeve holding the shaft against endwise movement but permitting it to incline or rock vertically as the angle of the arm 19 is adjusted. A universal joint 24 connects the front end of the threaded shaft 22 with a forwardly extending adjusting rod 25 which is supported in a bracket 26 extending from the beam structure and having an operating crank 27 at its front end. The operator, from his seat on the tractor, can conveniently rotate the crank handle 27 for changing the angle of the arm 17 and thereby changing the depth adjustment of the plow.

The rear furrow wheel 12 is mounted on a spindle 28 which is journaled for lateral swinging movement in a substantially vertical bearing formed as one part of a casting 29. This casting also comprises a substantially horizontal bearing which is journaled on the swinging end of a crank member 31. The latter is pivotally supported in a bearing boss 32 formed at the rear end of a flat web or bracket portion 33 cast integral with the wheel supported frame structure F. The casting 29 is held in proper position by a link 30, pivotally connected at one end to a lug on the lower portion of the casting 29 and at the other end with a lug on the casting 33 located below the sleeve portion 14 thereof. These particular details do not per se form an essential part of the present invention, being similar in many respects to the rear end construction shown in Patent No. 1,859,942, issued May 24, 1932, to Carl G. Strandlund. The angular position of the casting 29 with respect to the frame structure F is controlled by a link 34 which is connected at one end to an arm 35 extending upwardly from this end of the crank axle 13, and which is connected at its other end to an arm 36 fixed to the crank member 31 and extending upwardly therefrom. It will thus be seen that the casting 29 and rear furrow wheel 12 are thereby caused to respond to the adjusting and lifting and lowering motions of the crank axle 13, downward rocking of the latter causing the arm 36 and associated crank 31 to also swing downwardly, thereby swinging the rearmost end of the spindle 28 downwardly, as set forth in the patent mentioned above.

A draft bar 38 is bolted to the two bars 5, 5' of the beam structure B by bolts 39, 39'. At its forward end this draft bar 38 is connected with a draft connection in the form of an adjustable draft coupling member 41 comprising two side plates 42 and 43 and a transposable block 44. This block is adapted to be secured to the plates 42 and 43 by bolts 45, the block having apertured bosses for receiving these bolts, which pass through the side plates 42, 43 and through the draft bar 38. The forward ends of said side plates are connected to a draft link 46 which is pivotally connected to the tractor T at 47.

The full line illustration in Figure 1 shows the draft bar connected to the left side of the coupling member 41 for obtaining one line of draft or point of draft application. The dotted line illustration in Figure 1 shows the draft bar 38 shifted to the right side of the coupling member 41 for obtaining another line of draft or point of draft application. Still another draft adjustment can be obtained by transposing the block 41 to the outer side of either of the side plates 42 or 43 and mounting the draft bar 38 between these side plates. Such draft adjustment is illustrated in Figure 3. These different draft adjustments can be employed to accommodate the different adjustments of the widths of the furrows, as will be presently described.

Referring now to the manner in which these furrow adjustments are made, the bar 5 of the beam structure B is connected with the wheel supporting frame structure F by a bolt 51 which passes through said bar and through a hole 52 provided in the web or bracket portion 33 of the frame structure.

This bolt constitutes a pivot axis relatively to which the horizontal angle between the beam structure and the frame structure is adjusted. Referring to Figure 2, the bracket portion 33 is provided with a plurality of slots 53, 54 and 55 having their lengths extending substantially concentrically with respect to the pivot aperture 52. Bolts 56, 57 and 58 extend down through holes in the bars 5, 5' of the beam structure and pass through the slots 53, 54 and 55. It will be evident that by releasing these bolts the angle between the beam structure and the wheel supporting frame structure can be adjusted as desired, and that the retightening of these bolts will securely clamp the two structures in the desired angular relation. For assisting in effecting and maintaining this adjustment, a link 59 is pivotally connected to the beam structure B at 61. The other end of this link, which is threaded, passes freely through an arm or lug 62 projecting from a forward extension of the bracket portion 33. Two nuts 63, 63' screw over the link and are adapted to engage opposite sides of the stationary arm 62. The tightening of these nuts against said arm results in the link 59 functioning as a rigid strut between the two structures for holding the same at the desired angle of adjustment. It will also be seen that by backing one of the nuts away from the arm 62 the other nut can be utilized as a mechanical means for shifting the two structures B and F angularly relatively to each other.

The full line illustration of the plow in Figure 1 shows the beam structure adjusted for a narrow width of furrow, this width being indicated by the distance $x$ between the dot and dash lines extended from the forward edges of the plow disks 6.

The draft bar 38 is preferably so connected with the coupling member 41 that the plow will occupy the proper relation to the plowed land when the righthand tractor wheel 65 is traveling in the last furrow made in the previous round of the plow. This relative position of the tractor is illustrated by the dot and dash lines in Fig. 1.

The dotted line illustration of the plow shows the beam structure B inclined at a more obtuse angle relatively to the wheel supporting frame structure F. The width of the furrow cut by this adjustment is indicated by the distance $y$ between the dot and dash lines extended from the leading edges of the discs. The point of draft application may be adjusted to suit this greater width of furrow by placing the draft bar on the righthand side of the coupling member 41, as illustrated in dotted lines in Fig. 1, or by placing the draft bar between the plates 42 and 43, as illustrated in Fig. 3. The corresponding position of the tractor, with reference to the plow, during this wide furrow adjustment, is approximately illustrated by the dotted line showing of the tractor in Fig. 1.

Obviously, the plow may be given any intermediate adjustment for cutting a width of furrow intermediate the two extremes represented by the distances $x$ and $y$. There is no essential relation of the draft bar 38 relatively to the coupling member 41 for any particular furrow adjustment, although, most generally, the draft bar will be on the lefthand side of the coupling member for a narrow width of furrow, and will be on the righthand side of the coupling member or intermediate the plates 42 and 43 for a relatively wide width of furrow.

Attention is directed to the fact that by the present manner of changing the width of cut, the angular position of the discs with respect to the line of advance is also automatically shifted in the proper direction. In order that the discs can operate satisfactorily in relatively hard ground, in which case only a narrow furrow can be cut, the discs must be positioned more broadside to the line of advance so that they act somewhat like shovels. It will be noted that when the plow is adjusted for cutting a relatively narrow furrow, the discs occupy this general position relatively to the line of advance. On the other hand, in softer soil, where a much wider cut may be taken, the discs may be set at a lesser angle to the line of advance, and it will be noted that when the plow is adjusted for such wider cut the discs occupy this general position. In the different adjustments of the plow, the relation of the land wheel 11 is not disturbed, the axis of this wheel remaining approximately at right angles to the line of advance, and the beam structure B being adjusted angularly relatively to the axis of this land wheel.

While I have shown what I regard to be the preferred embodiment of my invention, it will be understood that such is merely exemplary, and that the same adjustments may be obtained in other equivalent constructions without departing from the essence of the invention.

I claim:—

1. In a plow, the combination of a frame member, wheel means supporting the same, a beam member, plow discs carried by said beam member, means connecting said frame and beam members permitting the horizontal angle therebetween to be adjusted for varying the widths of the furrows cut by said discs, and a link extending between said members for maintaining the angular adjustments established therebetween, said link being pivotally mounted at one end thereof on the beam member for horizontal swinging movement therewith.

2. In a plow, the combination of a frame member, wheel means supporting the same, a beam member, plow discs carried by said beam member, a pivot connecting said frame and beam members permitting the horizontal angle therebetween to be adjusted for changing the widths of the furrows cut by said discs, a link operatively connected to and extending between said members, the link being pivoted at one end thereof to the beam member for horizontal swinging movement therewith, and means for adjusting the effective length of said link for maintaining the angular adjustments established between said frame and beam members.

3. In a plow, the combination of a frame member, wheel means supporting the same, a beam member, plow discs carried by said beam member, said members comprising cooperating attaching portions, one of said attaching portions having slots, bolts extending through the slots for clamping said portions together, said bolts permitting said members to be adjusted angularly for changing the widths of the furrows cut by said discs, and a link connected to and extending between said members and comprising means for varying the effective length of said link for maintaining the angular adjustments between said members.

4. In a plow, the combination of a frame member, a crank axle rockably mounted in said frame member, a land wheel journaled on said crank axle, a furrow wheel connected with said frame member, lifting mechanism cooperating with said land wheel for swinging said crank axle, means for transmitting such swinging movement to said furrow wheel, a beam member, plow discs carried by said beam member, said frame member comprising a bracket portion, a pivot bolt connecting said beam member with said bracket portion and permitting said frame member and beam member to be angularly adjusted for varying the widths of the furrows cut by said discs, said bracket portion comprising a plurality of slots extending substantially concentrically with respect to said pivot bolt, clamping bolts extending through said beam member and through said slots for clamping said members together in their different angular positions, a link pivotally connected with one of said members and passing through an aperture in the other of said members, and nuts screwing over said link and engaging opposite sides of said aperture for adjusting the effective length of said link either for angularly shifting said members relatively to each other, or for maintaining the angular adjustments established therebetween.

5. In a plow, the combination of a beam structure, plow discs carried thereby, a supporting wheel for the plow, means for changing the angle of said beam structure relatively to the line of advance of said plow for adjusting the width of furrow cut, a draft bar extending forwardly from the plow, a coupling member for coupling said draft bar with a tractor or the like, and means for adjusting the position of said draft bar relatively to said coupling member for changing the angle of the line of draft application to the plow.

6. In a plow, the combination of a beam structure, plow discs carried thereby, a wheel supported frame structure for the plow, means connecting said beam structure with said frame structure providing for horizontal angular adjustments between said structures, a draft bar extending forwardly from the plow, a coupling member adapted to be coupled with a tractor or the like, and means connecting said draft bar with said coupling member permitting said draft bar to be transposed to different sides of said coupling member.

7. In a plow, the combination of a frame member, land and furrow wheels supporting said frame member, a beam member, plow discs carried by said beam member, means adjustably connecting said frame and beam members permitting the horizontal angle therebetween to be adjusted for changing the widths of the furrows cut by said discs, a draft bar extending forwardly from the plow, a coupling member, means for connecting said coupling member with a tractor, said coupling member comprising two spaced plates, and means for connecting said draft bar on the outer side of either of said plates or between said plates for adjusting the line of draft transmission to the plow.

8. A tractor drawn agricultural implement comprising a draft bar, a coupling member for pivotally connecting said draft bar to the tractor, said coupling member comprising two horizontally spaced plates and a transposable block, and means for connecting said draft bar to the outer side of either of said plates or between said plates for adjusting the line of draft between the tractor and the implement.

9. In a plow, the combination of a frame, a crank axle pivotally mounted on said frame at the rear thereof, a supporting wheel journaled on said crank axle, a power lift clutch driven by said wheel, a depth adjusting member movably mounted on said frame at the rear thereof, means connecting said depth adjusting member with said clutch whereby movement of said adjusting member swings said crank axle and changes the depth adjustment of the plow, an arm connected with said depth adjusting member, a nut mounted on said arm, a threaded shaft screwing through said nut, a bearing for said shaft holding the latter against longitudinal movement, an actuating member extending forwardly of said frame for rotating said shaft, supporting means for said actuating member and out of alignment with said threaded shaft and a universal joint connecting said actuating member with said shaft.

10. A plow adapted to be associated with a tractor, said plow comprising a draft bar and a beam carrying discs and a frame all attached together as a horizontally rigid unit, a crank axle pivotally mounted on said frame and having a land wheel journaled thereon, lifting mechanism cooperating with said land wheel for swinging said crank axle, a furrow wheel connected with said frame, means for transmitting said swinging movement to said furrow wheel, a depth adjusting member movably mounted on said frame, means connecting said depth adjusting member with said lifting mechanism whereby movement of said depth adjusting member swings said crank axle and changes the depth adjustment of the plow, an arm connected with said depth adjusting member, a nut pivotally mounted on said arm, a threaded shaft screwing through said nut, a bearing for said shaft holding the latter against longitudinal movement, and a crank actuating member supported adjacent the front end of said beam structure and operatively connected with said threaded shaft whereby said shaft may be rotated by the operator from his position on the tractor for changing the depth adjustment of the plow.

11. A plow adapted to be associated with a tractor, said plow comprising a draft bar and a beam carrying discs and a frame all attached together as a horizontally rigid unit, a crank axle pivotally mounted on said frame and having a land wheel journaled thereon, lifting mechanism cooperating with said land wheel for swinging said crank axle, a furrow wheel connected with said frame, means for transmitting said swinging movement to said furrow wheel, a depth adjusting member movably mounted on said frame, means connecting said depth adjusting member with said lifting mechanism whereby movement of said adjusting member swings said crank axle and changes the depth adjustment of the plow, an arm connected with said depth adjusting member, a nut pivotally mounted on said arm, a threaded shaft screwing through said nut, a bearing for said shaft holding the latter against longitudinal movement, a crank actuating member supported adjacent the front end of said beam structure and operatively connected with said threaded shaft whereby said shaft may be rotated by the operator from his position on the tractor for changing the depth adjustment of the plow, and a universal joint connecting said actuating member with said shaft.

12. In a plow, the combination of a frame member, a crank axle pivotally mounted on said frame, a supporting wheel journaled on said crank axle, a furrow wheel connected with said frame member, a beam member, plow discs carried by said beam member, said frame and beam members comprising cooperating attaching portions, one of said attaching portions having slotted bolt holes therein, bolts passing through said bolt holes for securing said attaching portions together with said frame and beam members disposed in different angular relations for adjusting the width of the furrows cut by said discs, a power lift clutch driven by said supporting wheel, a depth adjusting member movably mounted on said frame, means connecting said depth adjusting member with said clutch whereby movement of said adjusting members swings said crank axle and changes the depth adjustment of the plow, an arm connected with said depth adjusting member, a nut mounted on said arm, a threaded shaft screwing through said nut, a bearing for said shaft holding the latter against longitudinal movement, an actuating member for rotating said shaft, and a universal joint connecting said actuating member with said shaft.

13. In a plow, the combination of a frame member, a crank axle pivotally mounted on said frame, a land wheel journaled on said crank axle, a furrow wheel connected with said frame member, a beam member, plow discs carried by said beam member, said frame and beam members comprising cooperating attaching portions, one of said attaching portions having slotted bolt holes therein, bolts passing through said bolt holes for securing said attaching portions together with said frame and beam members disposed in different angular relations for adjusting the width of the furrows cut by said discs, a power lift clutch driven by said land wheel, a crank pin rotated by said clutch, a rocking member pivotally supported on said frame and having two arms extending therefrom, a link connecting one of said arms with said crank pin, a nut pivotally supported on the other of said arms, a threaded shaft screwing through said nut, a bearing for said shaft preventing longitudinal movement thereof, and a crank actuating member supported adjacent to the front end of said beam structure and operatively connected with said threaded shaft whereby said shaft may be rotated by the operator from his position on the tractor for changing the depth adjustment of the plow.

14. In a plow, the combination of a beam structure, plow discs carried thereby, a wheel supported frame structure, means connecting said beam structure with said frame structure providing for horizontal angular adjustments between said structures, a link pivotally connected at one end to the beam structure intermediate the ends thereof, said link connected to and extending between said structures for maintaining the angular adjustments established between said structures, and means for adjusting the effective length of said link.

15. In a plow, the combination of a beam structure, plow discs carried thereby, a wheel supported frame structure, means connecting said beam structure with said frame structure providing for horizontal angular adjustments between said structures, a link pivotally connected at one end to the beam structure intermediate the ends thereof, said link connected to and extending between said structures and comprising means for varying the effective length of said link for maintaining the angular adjustments between said structures, and means for adjusting the depth of the plow.

16. In a plow, the combination of a beam structure, plow discs carried thereby, a supporting wheel for the plow, means for changing the angle of said beam structure relatively to the line of advance of said plow for adjusting the width of furrow cut, a draft bar extending forwardly from the plow, a coupling member for coupling said draft bar with a tractor or the like, and means for adjustably securing the coupling member to the draft bar in a plurality of bodily shifted positions to change the point of draft application relative to the draft bar.

17. In a plow, the combination of a beam structure, plow discs carried thereby, a wheel supported frame structure, means connecting said beam structure with said frame structure and providing for horizontal angular adjustments between said structures, link means connected with the beam structure adjacent the position of the frame structure and extending between said structures for maintaining the angular adjustments established therebetween, and means for adjusting the effective length of said link means.

18. In a plow, the combination of a beam structure, plow discs carried thereby, a wheel supported frame structure, means pivotally connecting said beam structure with said frame structure and providing for horizontal angular adjustments between said structures, link means connected between the beam structure and the frame structure adjacent said pivotal connecting means, said link means having adjustable threaded connection with one of said structures for fixing the latter in predetermined angular relation, and means for adjusting the depth of operation of the plow discs.

In witness whereof, I hereunto subscribe my name this 20th day of July, 1929.

CARL G. STRANDLUND.